3,496,122
MODIFIED TRIGLYCIDYLISOCYANURATE RESINS
Ulrich Niklaus, Munchenstein, and Daniel Porret, Binningen, Switzerland, assignors to Ciba Limited, Basel, Switzerland, a company of Switzerland
No Drawing. Filed July 14, 1967, Ser. No. 653,313
Int. Cl. C08g 30/08
U.S. Cl. 260—2     10 Claims

ABSTRACT OF THE DISCLOSURE

A modified triglycidylisocyanurate obtained by reaction at elevated temperature (1) triglycidylisocyanurate with (2) a compound that contains at least one functional group selected from the group consisting of primary alcoholic hydroxyl group, carboxyl group and carboxylic acid anhydride group, there being used in said reaction for 1 mol of triglycidyl-isocyanurate 0.3 to 1.2, functional group when said group is selected from the group consisting of equivalents of carboxyl group and primary alcoholic hydroxyl group, and 0.15 to 0.6 equivalent of functional group, when said group is carboxylic acid anhydride group. The modified triglycidyliso-cyanurates of this invention are especially suitable for moulding compositions.

---

The value of s-triazine as a structural element of crosslinked macromolecules has been known for years, and these synthetic resins are distinguished by their remarkably good thermal and electrical properties. Their first industrial use was in condensation products of melamine and subsequently in homopolymers and copolymers of triallylcyanurate. In the sphere of epoxy resins reaction products of cyanuric acid with epichlorohydrin have already been disclosed in Swiss specification No. 345,347. Similar reactions form the object of U.S. specification No. 2,809,942. The reaction products are almost throughout resins having a relatively low epoxide content of about 5 to 7 equivalents per kg. (theory: 10.1); they lend themselves well to working up but for many intended purposes their stability is inadequate. Subsequently it has been possible to obtain by suitable manufacturing processes, represented for example by German specifications 1,180,372 and 1,211,650, triglycidylisocyanurates that have an almost theoretical epoxide content, being crystalline and having adequate stability.

However, these crystalline products have distinct disadvantages which are considerable obstacles to their industrial suitability. Thus, it is due to the fact that triglycidylisocyanurate only begins to melt above 100° C., that dicarboxylic acid anhydrides are almost the only suitable relevant curing agents because amine curing agents react far too violently at the requisite temperatures and give rise to useless castings. Since triglycidylisocyanurate has the further disadvantage of very poor solubility, it is impossible to manufacture a homogeneous casting composition and to cure it at a low temperature. The considerable incompatibility with other epoxy resins also prevents the formulation of special resins that are homogeneous at room temperature which could otherwise under certain conditions be cured with polyamines.

Finally, the epoxide content of triglycidylisocyanurate is very high so that the reaction with curing agent is very exothermic and this, as is known, is very disadvantageous, and may even be inacceptable, with almost all working up operations.

Surprisingly, it is possible to overcome the disadvantages described above by partially reacting triglycidyliso-cyanurate with alcohols, carboxylic acids, carboxylic acid anhydrides or mixtures of these two modifying agents. This partial reaction not only gives rise to reaction products having a desirable epoxide content of the order of 6 equivalents per kg. but the reaction products formed are typical resins having a low melting range and, compared with triglycidyliso-cyanurate, very much better solubility which enables these resins to be formulated with other resins and worked up at room temperature. Another very surprising thing is that, compared with triglycidyliso-cyanurate, the stability is nearly always unaffected since, going by our previous knowledge, a lower epoxide content was always accompanied by a reduced stability.

Accordingly, the present invention provides a process for modifying triglycidylisocyanurate, characterized in that triglycidylisocyanurate is reacted with compounds that contain at least one primary alcoholic hydroxyl group and/or carboxyl group (which may be present as a carboxylic acid anhydride group), using for every mol of triglycidylisocyanurate 0.1 to 1.5, preferably 0.3 to 1.2, equivalents of carboxyl groups and/or primary alcoholic hydroxyl groups.

Suitable alcohols are monohydric primary alcohols, such as methanol, ethanol, n-propanol, n-butanol and preferably higher aliphatic alcohols such as n-octyl alcohol, 2-ethylhexanol, n-nonyl alcohol, lauryl alcohol, stearyl alcohol or oleyl alcohol.

Best results are achieved with alcohols containing at least two primary hydroxyl groups, such as ethyleneglycol, diethylene glycol, triethyleneglycol, propyleneglycol-1,3, butyleneglycol-1,4 pentanediol-1,5- hexanediol-1,6, glycerol, glucitol, mannitol, pentaerythritol, and also polyethylene-glycols, polypropyleneglycols polybutyleneglycols and poyhexyleneglycols.

The reaction with hydroxy groups is carried out in the presence of quaternary ammonium bases or of their salts, such as benzyl trimethyl ammonium chloride or hydroxide, as catalysts. Alternatively, there may be used ion exchange resins containing quaternary ammonium groups.

Preferred carboxylic acids suitable for use as starting materials in the process of this invention are aliphatic and cycloaliphatic mono- and polyfunctional carboxylic acids and partially esterified polycarboxylic acids.

Examples of monocarboxylic acids are acetic, propionic, butyric, valeric, pivalic, caproic, 2-ethylbutyric, oenanthic, caprylic, capric, lauric, myristic, palmitic, stearic and 2-ethylhexanoic acid; acrylic, methacrylic, crotonic, angelic, sorbic, oleic, linoleic, linolenic, tall oil fatty acid, lineseed oil fatty acid, erucic, brassidic, ricinenic acid, hexahydrobenzoic, tetrahydrobenzoic, abietic acid; chloracetic, dichloracetic, 3-chloropropionic, bromacetic, 2-bromobutyric, ethoxyacetic, a naphthenic, 12-hydroxystearic, lactic, 2-methyllactic, citric and tartaric acid.

Examples of polycarboxylic acids are oxalic, malonic, succinic, glutaric, adipic, pimelic, suberic, sebacic acid; fumaric, itaconic, aconitic, allylsuccinic, dodecenylsuccinic, butane-1,2,4-tricarboxylic, butanetetracarboxylic, hexahydrophthalic, tetrahydrophthalic, hexachloro-endomethylene-tetrahydrophthalic, and endomethylene-tetrahydrophthalic acid.

Further suitable starting materials for use in the present process are partially esterified polycarboxylic acids such as oxalic, malonic, succinic, glutaric, adipic, pimelic, suberic, sebacic acid; fumaric, itaonic, aconitic, allylsuccinic, dodecenylsuccinic, butane-1,2,4-triarboxylic acid, butanetetracarboxylic; hexahydrophthalic, tetrahydrophthalic, hexachloro-endomethylene-tetrahydrophthalic, and endomethylene-tetrahydrophthalic acid, which are partially esterified with alcohols such as methanol, ethanol, propanol, isopropanol, n-butanol, isobutanol, tertiary butanol, amyl alcohols, hexanols, 2-ethylhexanol-1, lauryl alcohol, oleyl alcohol or cyclohexanol, so that they still contain at least one free carboxyl group.

Instead of the said carboxylic acids their anhydrides may be used, for example the following anhydrides: acetic, propionic, butyric, valeric, caproic, oenanthic, capric, lauric, myristic, palmitic, stearic, ethylhexanoic, angelic, oleic, glutaric, succinic, azelaic, pimelic, sebacic, itaconic, butanetricarboxylic, butanetetracarboxylic, methylendomethylene - tetrahydrophthalic, dodecenylsuccinic-tetrahydrophthalic, hexahydrophthalic, hexachloro-endomethylene-tetrahydrophthalic or endomethylene-tetrahydrophthalic anhydride.

If desired, it is also possible to use aromatic mono and polycarboxylic acids such as phenylacetic, cinnamic, benzoic, 3,5-dimethylbenzoic, α-naphthoic, β-naphthoic, phenoxyacetic, p-hydroxybenzoic, m-hydroxybenzoic, salicylic, isophthalic, terephthalic, pyromellitic or phthalic acid. As aromatic mono- or polycarboxylic acid anhydrides there may be used, if desired: benzoic, phenylacetic, α-naphtholic, cinnamic, phthalic or pyromellitic anhydride.

It is also possible to use heterocyclic acids such as nicotinic or isonicotinic acid.

If desired, there may also be used partial esters of the aromatic polycarboxylic acids listed above.

According to this invention there may be used mixtures of hydroxy compounds and compounds containing carboxyl groups, or else compounds containing both primary hydroxy groups and carboxyl groups, for example glycollic acid.

The present invention further includes modified triglycidylisocyanurates obtained by reacting triglycidylisocyanurate with compounds containing at least one primary alcoholic hydroxy group and/or carboxyl group (which may be present as a carboxylic acid anhydride group), using for every mol of triglycidylisocyanurate 0.1 to 1.5 preferably 0.3 to 1.2, equivalents of carboxyl groups and/or primary alcoholic hydroxyl groups.

The modified triglycidylisocyanurates obtained by the present invention react with the conventional curing agents for epoxy compounds and can be crosslinked or cured by the addition of such resins in the same way as other polyfunctional epoxy compounds or epoxy resins. As such curing agents there are suitable basic or especially acid compounds.

The following curing agents have proved useful: Amines or amides such as aliphatic and aromatic primary, secondary and tertiary amines, for example p-phenylenediamine, bis-(p-aminophenyl)-methane, ethylenediamine, N,N-diethylethylenediamine, diethylenetriamine, tetra-hydroxyethyl) - diethylenetriamine, triethylenetetramine, N-N-dimethylpropylenediamine, Mannich's bases such as tris - (dimethylaminomethyl) - phenol; dicycandiamide, urea-formaldehyde resins, melamine-formaldehyde resins, polyamides, for example those from aliphatic polyamines and dimerized or trimerized, unsaturated fatty acids, polyhydric phenols, for example resorcinol, bis-(4-hydroxyphenyl)-dimethylmethane, phenol-formaldehyde resins, reaction products of aluminum alcoholates or phenolates with compounds of tautomeric reaction of the aretoacetic ester type, Friedel-Crafts catalysts, for example $AlCl_3$, $SbCl_5$, $SnCl_4$, $ZnCl_2$, $BF_3$ and their complexes with organic compounds, for example $BF_3$-amine complexes, metal fluoroborates such as zinc fluoroborate; phosphoric acid; boroxines such as trimethoxyboraxine.

Preferred curing agents are polybasic carboxylic acids and their anhydrides, for example the following anhydrides; phthalic, tetrahydrophthalic, hexahydrophthalic, methyl-hexahydrophthalic, endomethylene - tetrahydrophthalic, methylendomethylene-tetrahydrophthalic (=methyl nadic anhydride) hexachloro-endomethylene-tetrahydrophthalic, succinic, adipic, maleic, allylsuccinic, dodecenylsuccinic; 7-allyl-bicyclo (2.2.1)-hept-5-ene-2,3-dicarboxylic anhydride, pyromellitic dianhydride or mixtures of such anhydrides. Preferred curing agents are those which are liquid at room temperature.

It is possible to use additionally accelerators, such as tertiary amines or their salts or quaternary ammonium compounds, for example tris(dimethylaminomethyl)phenol, benzyldimethylamine, or benzyl dimethylammonium phenolate, tin(II)salts of carboxylic acids such as tin (II)octoate or alkali metal alcoholates, for example sodium hexylate.

As a rule, however, such accelerators are not needed and this is a special advantage of the modified triglycidylisocyanurates obtained by the present process compared with most known cycloaliphatic diepoxy compounds.

The curing of the modified triglycidylisocyanurates obtained by the present process with anhydrides is advantageously carried out with 0.5 to 1.1 gram equivalents of anhydride groups for every gram equivalent of epoxide groups.

As a rule, optimal properties of the cured products are obtained by using 1 equivalent of anhydride groups for every equivalent of epoxide groups. However, when an eccelerator containing hydroxyl groups is additionally used, it is of advantage to increase the amount of anhydride curing agent added.

The term "curing" as used in this context describes the conversion of the above-mentioned diepoxides into insoluble and infusible crosslinked products, in fact generally with simultaneous shaping to furnish shaped products, such as castings, mouldings or laminates, or flat structures such as lacquer films or cemented objects.

Accordingly, the present invention provides also curable mixtures containing the modified triglycidylisocyanurates obtained by the present process, if desired in combination with other diepoxy or polyepoxy compounds and also curing agents for epoxy resins, preferably di- or polycarboxylic acid anhydrides.

The modified triglycidylisocyanurates of this invention or their mixtures with polyepoxy compounds and/or curing agents may be admixed at any stage prior to the curing operation with a filler, plasticizer, pigment, dyestuff, flame-inhibitor or mould lubricant.

Suitable extenders and fillers are, for example, asphalt, bitumen, glass fibres, cellulose, mica, quartz meal, aluminium hydroxide, gypsum, kaolin, ground dolomite, colloidal silica having a large specific surface (Aerosil) or metal powders, such as aluminium powder.

The curable mixtures may be used in the unfilled or filled state, if desired in the form of solutions or emulsions, as textile assistants, coating compositions, laminating resins, paints, lacquers, dipping resins, casting resins, brushing agents and pore fillers, floorings, potting and insulating compounds for the electrical industry, especially for overhead line insulators, adhesives and for the manufacture of such products.

The modified triglycidylisocyanurates of this invention are especially suitable for moulding compositions.

Percentages in the following examples are by weight.

EXAMPLE 1

300 parts of powdered triglycidylisocyanurate (containing 9.45 epoxide equivalents per kg.) were heated to 130° C., and in the course of 30 minutes 50 parts of propionic acid were dropped into the resulting melt. Reaction set in almost instantaneously and gave rise to a highly viscous resin containing 6.02 epoxide equivalents per kg.; in contradistinction to unmodified triglycidylisocyanurate this resin gave a clear mixture at room temperature with all conventional liquid epoxy resins. To measure its stability a specimen of the resin was heated for 24 hours at 120° C. in a Hoeppler viscosimeter tube. During this time the viscosity rose only from 90 to 120 centipoises, while the epoxide content dropped to 5.7. Another specimen of the resin of this invention was stored at 60° C. and after one month it was found that its epoxide content was still practically unchanged, namely 5.96.

To measure the mechanical properties 100 parts of the resin of this invention were made at 80° C. into a casting resin mixture with 88 parts (0.95 mol anhydride per epoxide equivalent) of the curing agent hexahydrophthalic anhydride and 12 parts of a sodium alcoholate acting as accelerator (which has been prepared by dissolving 0.82 part of sodium metal in 10 parts of 2,4-dihydroxy-3-hydroxymethylpentane) and this composition was then poured at the same temperature (80° C.) into an aluminium mould (40 x 10 x 140 mm.) and allowed to gel for 4 hours, during which the temperature of the casting rose to 188° C. owing to the exothermic reaction. To complete the curing the casting was then heated for 16 hours at 120° C. The following test results were recorded: Heat distortion point according to Martens (DIN 53458): 116° C. Flexural strength (VSM 77103): 10.4 kg./mm.², Deflection on rupture: 7.0 mm. Impact strength (VSM 77105): 9 cm. kg./cm.².

A casting prepared from triglycidylisocyanurate under identical conditions, likewise with 0.95 mol of curing agent for every epoxide equivalent, underwent on account of the exothermic reaction a temperature increase to 252° C.; the cured casting revealed the following test results: Heat distortion point according to Martens (DIN 53548): 136° C. Flexural strength (VSM 77103): 9.8 Deflection 5.3 and impact strength (VSM 77105): 11.

EXAMPLE 2

A mixture of 594 g. of triglycidylisocyanurate (containing 9.55 epoxide equivalents per kg.), 90 g. of 1,4-butanediol and 1 g. of benzyl trimethylammonium chloride was heated to 138° C. At this temperature the mixture is homogeneous. The course of the additive reaction was observed by measuring the content of the epoxide group. After 6 hours the mixture contained only 5.9 epoxide equivalents per kg., corresponding to an addition of 1 mol of butanediol onto 2 mols of triglycidylisocyanurate. The experiment was then discontinued by cooling. A viscous-liquid, faintly yellowish resin was obtained which could be mixed with most liquid epoxy resins to form a resin that was homogeneous at room temperature.

A casting prepared from the resin of this invention, with the use of 0.95 mol of hexahydrophthalic anhydride per epoxide equivalent, and cured for 12 hours at 140° C., displayed good mechanical properties and a heat distortion point according to Martens (DIN 53458) of 155° C.

EXAMPLE 3

In the course of one hour a mixture of 30 parts of hexahydrophthalic anhydride, 40 parts of oleic acid and 30 parts of propionic acid was dropped at 130° C. into 400 parts of triglycidylisocyanurate (containing 9.54 epoxide equivalents per kg.). To finalize the reaction the batch was heated at this temperature for ½ hour longer and a highly viscous resin was obtained which contained 6.22 epoxide equivalents per kg. A first specimen of this resin was heated for 24 hours at 120° C. and a second specimen for 4 weeks at 60° C., during which times the epoxide content dropped only little, namely to 6.08 and 6.18 respectively. Another specimen of the resin, which can be stirred at room temperature with the conventional liquid epoxy resins based on bisphenol A or cycloaliphatic compounds to form homogeneous mixtures, was cured as described in Example 1.

The exothermic peak temperature during curing was only 152° C. and the resulting cured casting had similar, good properties.

EXAMPLE 4

The procedure was as described in Example 1, except that 91 parts of adipic acid were reacted with 520 parts of triglycidylisocyanurate. The resulting product was a highly viscous, stable resin containing 6.1 epoxide equivalents per kg. A specimen of this product was mixed with 80 parts of hexahydrophthalic anhydride for every 100 parts of resin and cured for 14 hours at 140° C., after which it displayed a heat distortion point according to Martens (DIN 53458) of 168° C.

EXAMPLE 5

The reaction described in Example 1 was carried out with 300 parts of triglycodiylisocyanurte and 100 parts of oleic acid, and a waxy, very stable resin containing 6.21 epoxide equivalents per kg. was obtained. Castings cured for 14 hours at 140° C. with 91 parts of hexahydrophthalic anhydride for every 100 parts of the resin of this invention displayed an excellent behaviour towards leakage currents and electric arcs, a heat distortion point according to Martens (DIN 53458) of 133° C. and possessed good mechanical properties.

EXAMPLE 6

The procedure was as described in Example 2, except that butanediol was replaced by 62 parts of ethyleneglycol. A highly viscous resin containing 6.32 epoxide equivalents per kg. was obtained. 100 parts of this resin were mixed with 12 parts of the sodium alcoholate described in Example 1 and 96 parts of hexahydrophthalic anhydride; the mixture was poured into aluminium moulds, gelled at 80° C. and cured for 12 hours at 120° C. The resulting castings displayed a high thermal stability and very good resistance towards leakage currents and electric arcs.

We claim:

1. A modified triglycidylisocyanurate obtained by reacting at an elevated temperature (1) triglycidylisocyanurate with (2) a compound that contains at least one functional group selected from the group consisting of primary alcoholic hydroxyl group, carboxylic group and carboxylic acid anhydride group, wherein said carboxylic group is derived from a polycarboxylic acid and mixtures of such compounds with monocarboxylic acids, there being used in said reaction for 1 mol of triglycidylisocyanurate 0.1 to 1.5 equivalents of functional group when said group is selected from the group consisting of carboxyl group and primary alcoholic hydroxyl group and 0.05 to 0.75 equivalent of functional group, when said group is carboxylic acid anhydride group, and said reaction being effected in the presence of an etherification catalyst when said group is a primary alcoholic hydroxyl group.

2. A modified triglycidylisocyanurate according to claim 1, which is derived from an alcohol containing at least 2 primary hydroxyl groups as compound (2).

3. A modified triglycidylisocyanurate according to claim 1, which is derived from an alcohol containing at least 2 primary hydroxyl groups as compound (2).

4. A modified triglycidylisocyanurate according to claim 3, which is derived from an alkyleneglycol as compound (2).

5. A modified triglycidylisocyanurate according to claim 3, which is derived from a polyalkyleneglycol as compound (2).

6. A modified triglycidylisocyanurate according to claim 3, which is derived from an alcohol compound containing at least two primary hydroxyl groups and at least one secondary hydroxyl group as compound (2).

7. A modified triglycidylisocyanurate according to claim 1, which is derived from a polycarboxylic acid selected from the group consisting of aliphatic and cycloaliphthalic ploycarboxylic acid as compound (2).

8. A modified triglycidylisocyanurate according to claim 1, which is derived from a carboxylic acid anhydride, selected from the group consisting of aliphatic and cycloaliphatic carboxylic anhydride as compound (2).

9. A modified triglycidylisocyanurate according to claim 1 which is derived from a polycarboxylic acid anhydride as compound (2).

10. A modified triglycidylisocyanurate obtained by reacting at elevated temperature (1) triglycidylisocyanurate with (2) a compound that contains at least one functional group selected from the group consisting of primary alcoholic hydroxyl group, carboxyl group and carboxylic acid anhydride group wherein said carboxylic group is derived from a polycarboxylic acid and mixtures of such compounds with monocarboxylic acids, there being used in said reaction for 1 mol of triglycidylisocyanaurate 0.3 to 1.2 equivalents of functional group when said group is selected from the group consisting of carboxyl group and primary alcoholic hydroxyl group and 0.15 to 0.6 equivalent of functional group, when said group is carboxylic acid anhydride group, and said reaction being effected in the presence of an etherification catalyst when said group is a primary alcoholic hydroxyl group.

References Cited

UNITED STATES PATENTS 2,741,607    4/1956    Bradley et al.
2,893,978    7/1959    Cooke _____ 260—348

WILLIAM H. SHORT, Primary Examiner

T. PERTILLA, Assistant Examiner

U.S. Cl. X.R.

117—161; 161—184; 252—8.9; 260—9, 37, 830, 831, 834

Notice of Adverse Decisions in Interferences

In Interference No. 97,490 involving Patent No. 3,496,122, U. Kiklaus and D. Porret, MODIFIED TRIGLYCIDYLISOCYANURATE RESINS, final judgment adverse to the patentees was rendered Mar. 7, 1973, as to claims 1, 7, 8 and 10.

[*Official Gazette July 10, 1973.*]

Disclaimer

3,496,122.—*Ulrich Niklaus*, Munchenstein, and *Daniel Porret*, Binningen, Switzerland. MODIFIED TRIGLYCIDYLISOCYANURATE RESINS. Patent dated Feb. 17, 1970. Disclaimer filed Apr. 11, 1973, by the assignee, *Ciba-Geigy AG*.

Hereby enters this disclaimer to claims 1, 7, 8 and 10 of said patent.

[*Official Gazette December 25, 1973.*]